United States Patent

Johnson

[15] 3,674,120
[45] July 4, 1972

[54] AUXILIARY SHOCK ABSORBER DAMPING VALVES

[72] Inventor: Ralph S. Johnson, Rochester, Mich.
[73] Assignee: General Motors Corporation, Detroit, Mich.
[22] Filed: Feb. 1, 1971
[21] Appl. No.: 111,282

[52] U.S. Cl. .................................................. 188/277, 236/93
[51] Int. Cl. .................................................................. F16f 9/52
[58] Field of Search ........................... 188/276, 277; 236/93

[56] References Cited

UNITED STATES PATENTS

| | | | |
|---|---|---|---|
| 1,797,799 | 3/1931 | Shutts | 188/277 X |
| 2,221,750 | 11/1940 | Ashby et al. | 236/93 X |

Primary Examiner—George E. A. Halvosa
Attorney—W. S. Pettigrew, J. C. Evans and K. H. MacLean, Jr.

[57] ABSTRACT

In preferred form, a direct acting hydraulic shock absorber with auxiliary passages between the working chambers of the shock absorber and the reservoir chamber controlled by a thermally responsive valve which blocks fluid flow upon sensing a predetermined fluid temperature. An annular channel formed about the pressure cylinder of the shock absorber has a wall portion spaced radially outward from openings in the pressure cylinder and has openings to the reservoir chamber. A cylindrical ring valve in the annular channel is spaced inwardly from the wall portion when it is below the predetermined temperature. The ring valve expands outwardly against the wall portion to block the auxiliary passages to the reservoir chamber when above the predetermined temperature.

3 Claims, 4 Drawing Figures

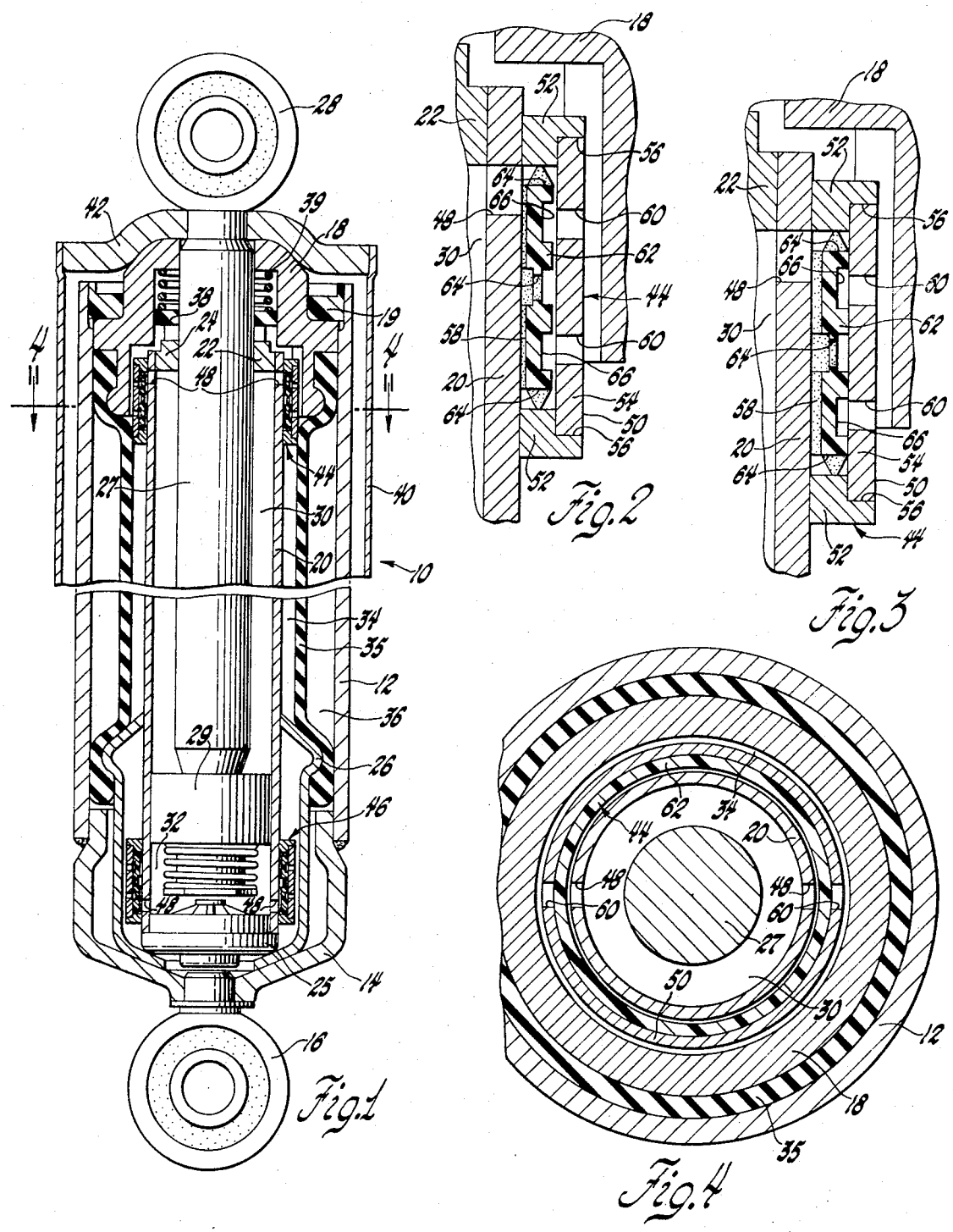
PATENTED JUL 4 1972　　3,674,120
INVENTOR.
Ralph S. Johnson
BY K. H. MacLean, Jr.
ATTORNEY

AUXILIARY SHOCK ABSORBER DAMPING VALVES

This invention relates to hydraulic shock absorbers having fluid temperature and viscosity compensation.

The viscosity of hydraulic fluid in shock absorbers varies considerably over the range of temperatures which it experiences in use. In winter, temperatures of near zero degrees causes the fluid viscosity to become relatively high. In summer, and when shock absorbers are used over relatively rough pavement, the viscosity of the hydraulic fluid is decreased. It is desirable to provide auxiliary fluid passages in the shock absorber between the working chambers and the reservoir chamber to decrease the restriction to fluid flow when the viscosity of the hydraulic fluid is high. This counteracts the decreased dampening effect caused by insufficient fluid flow through the shock absorber's valved piston due to increased viscosity. These auxiliary fluid passages must be valved to close when the hydraulic fluid attains a predetermined temperature.

The subject shock absorber includes auxiliary fluid passages between both the compression and the rebound chambers and the reservoir chamber for auxiliary fluid flow in addition to the normal fluid flow through a valved piston and a base valve assembly. The auxiliary passages are opened and closed by a valve comprising an annular ring valve which expands in response to the temperature of hydraulic fluid against a wall having openings to the reservoir chamber. The ring valve has a relatively high coefficient of thermal expansion, such as nylon with respect to the wall.

Therefore, an object of the invention is the provision of a direct acting hydraulic shock absorber having auxiliary fluid passages between both the compression and rebound chambers and the reservoir chamber which are valved to close and cutoff auxiliary fluid flow by the expansion of a ring valve in response to fluid temperature.

A further object of the invention is the provision of a direct acting hydraulic shock absorber having auxiliary fluid passages between both the compression and rebound chambers and the reservoir chamber which are blocked by the thermal expansible movement of a ring valve having a relatively high coefficient of thermal expansion against openings in a wall having a lower coefficient of thermal expansion.

Further objects and advantages of the present invention will be apparent from the following detailed description reference being had to the accompanying drawings in which a preferred embodiment is clearly shown.

IN THE DRAWINGS:

FIG. 1 is a vertical sectioned view of a hydraulic direct acting shock absorber including the subject auxiliary passages and valving;

FIG. 2 is an enlarged sectional view of the auxiliary passage with the valve in an open position;

FIG. 3 is a view similar to FIG. 2 but with the valve in a closed position; and

FIG. 4 is a horizontal sectioned view taken along section line 4—4 of FIG. 1 and looking in the direction of the arrows.

In FIG. 1 of the drawings a hydraulic direct acting shock absorber assembly 10 is illustrated. Assembly 10 includes an outer reservoir tube 12 which is attached at its lower end in a fluid-tight manner to a cup-shaped bottom end cap 14. A fitting 16 attached to the end cap 14 is adapted to secure the shock absorber assembly 10 to the unsprung mass of the vehicle.

The upper end of the reservoir tube 12 is enclosed by an end cap 18 which is held within the end of the reservoir tube in a fluid-tight manner by a ring 19. A smaller diameter pressure cylinder tube 20 is positioned concentrically within the reservoir tube 12. A piston rod guide 22 which is supported within the upper end of pressure cylinder tube 20 has an upwardly extending annular side 24 which is encircled by the end cap 18. This positions the pressure cylinder tube 20 coaxially with respect to reservoir tube 12. Rod guide 22 is axially retained within the top end of tube 20 by the end cap 18.

The lower portion of pressure cylinder tube 20 is positioned coaxially in the reservoir tube 12 by a base valve assembly 25 which is held within the lower end of the pressure cylinder tube 20 by a collar member 26 and the end cap 14. The design of the base valve assembly forms no part of the present invention and may be of the type disclosed in U.S. Pat. No. 2,583,169 issued Jan. 22, 1952 to Funkhouser.

Concentrically within pressure cylinder tube 20 and extending through rod guide 22 and end cap 18 is a piston rod 27. The upper end of the piston rod 27 extends through end cap 18 and is secured to a fitting 28 exteriorly of the shock absorber 10. The fitting 28 is adapted to secure the shock absorber 10 to the sprung mass of the vehicle. A valved piston 29 is attached to the lower end of piston rod 27 within pressure cylinder tube 20 for reciprocable movement therein. The design of the valved piston 29 is conventional and it may be of the type disclosed in U.S. Pat. No. 2,695,034 issued Nov. 23, 1954 to Brundrett et al. Relative movement between the sprung mass and the unsprung mass of the vehicle causes the piston rod 27 and the attached piston 29 to reciprocate within the pressure cylinder tube 20.

A variable volume rebound chamber 30 is formed within the upper portion of pressure cylinder tube 20 between rod guide 22 and valved piston 29. A variable volume compression chamber 32 is formed within pressure cylinder tube 20 between the valved piston 29 and the base valve assembly 25. Both chambers 30 and 32 are completely filled with hydraulic fluid during normal operation of the shock absorber. Movement of the valved piston 29 within pressure cylinder tube 20 toward the rod guide 22 necessarily decreases the volume of the rebound chamber 30. Likewise, movement of the valved piston 29 within pressure cylinder tube 20 towards base valve assembly 25 decreases the value of compression chamber 32. Valve elements (not visible) within piston 29 regulate fluid flow between chambers 30 and 32 caused by the reciprocation of the piston 29 by piston rod 27. This regulation of fluid flow through the piston 29 produces a dampening of relative movement between sprung and unsprung masses of the associated vehicle.

The movement of piston rod 27 downward within pressure cylinder tube 20 during a compression stroke causes a decrease in compression chamber volume greater than the increase in the rebound chamber volume. Likewise, reverse piston rod movement upward within pressure cylinder tube 20 during a rebound stroke causes an increase in compression chamber volume greater than the decrease in rebound chamber volume. The differential volume in either situation equals the volume of the piston rod 27 entering and exiting the rebound chamber 30. Because of this volumetric difference, a supplementary quantity of hydraulic fluid must be supplied to the compression chamber 32 on movement of the piston 29 upward in pressure cylinder tube 20, and excess fluid must be removed from compression chamber 32 upon movement of the piston 29 downward in pressure cylinder tube 20. A hydraulic fluid reservoir chamber 34 located in an annular space between the reservoir tube 12 and the pressure cylinder tube 20 supplies fluid during the rebound stroke and receives fluid during the compression stroke.

The base valve assembly 25 which is located between reservoir chamber 34 and compression chamber 32 regulates the flow of hydraulic fluid therebetween. Valving components (not visible) within base valve assembly 25 permit hydraulic fluid from the reservoir chamber 34 to enter the compression chamber 32 on movement of the piston 29 away from the valve 25. Other valving components within the base valve assembly 25 permit fluid to flow from the compression chamber 32 into the reservoir chamber 34 upon movement of the piston 29 downward in pressure cylinder tube 20.

It is apparent that the volume of fluid within reservoir chamber 34 varies considerably during the reciprocation of piston 29 within the pressure cylinder tube 20. To accommodate this change of fluid volume within the reservoir chamber without providing an air space, a flexible bladder 35, is secured at its opposite ends against the inside surface of the reservoir tube 12. The end cap 18 holds it at an upper end of the bladder and the collar 26 holds it at its lower end. The bladder 35 divides the space between the pressure cylinder tube 20 and the reservoir tube 12 into the fluid filled reservoir chamber 34 and a gas filled expansion chamber 36. The expansion chamber 36 accommodates the variable volume of fluid in the reservoir chamber 34.

An annular piston rod seal 38 encircles piston rod 27 to prevent leakage of hydraulic fluid from the shock absorber interior when the piston rod reciprocates within the pressure cylinder tube 20. The seal 38 is held against rod guide 22 by a coil spring 39 between the end cap 18 and the seal 38. The seal 38 is molded of a resilient material such as rubber or plastic.

A cylindrical dust shield 40 surrounds the upper end of reservoir tube 12 and is attached to an end member 42 which is secured to the piston rod 27. The dust shield 40 and the end member 42 prevents the entry of dirt and other foreign matter into the shock absorber between the piston rod 27 and end cap 18.

As previously stated, it is desirable to provide auxiliary fluid flow between the rebound and compression chambers 30, 32 and the reservoir chamber 34 when the fluid viscosity is high caused by low temperature. The present shock absorber includes valve assemblies 44 and 46 around the upper and lower ends of the pressure cylinder tube. Ports 48 through the pressure cylinder tube 20 allow passage of fluid between the working chambers 30, 32 and the reservoir chamber 34 whenever the temperature of the hydraulic fluid is below a predetermined value.

An enlarged view of valve assembly 44 is shown in FIGS. 2 and 3. The valve assembly 44 includes an annular valve cage housing 50 formed around the pressure cylinder tube 20 and overlying the openings 48. The valve cage housing 50 is formed by end members 52 which are pressed on the outer diameter of the pressure cylinder tube 20. An annular wall portion 54 is spaced radially outwardly from the pressure cylinder tube 20 by side members 52 and is supported in recesses 56 of the side members 52. The space between the pressure cylinder tube 20 and the wall 54 forms a flow passage 58 for fluid. Opening 60 in the wall 54 completes the passage from the working chamber of the shock absorber, through ports 48, passage 58 and openings 60 into the reservoir chamber 34.

A ring valve 62 within the passage 58 is free to thermally expand in response to the fluid temperature in a radially outward direction with respect to the wall 54. Openings 64 in the ring valve 62 permit fluid to flow from the port 48 into opening 60 when the ring valve 62 is in its open mode of operation as seen in FIG. 2.

As the temperature of the hydraulic fluid within the shock absorber increases, the ring valve 62 expands and increases in diameter. The expansion of the valve causes its outer surface to move outward toward the wall 54. At a predetermined fluid temperature, the ring valve 62 and wall 54 coact to block the opening 60. Grooves 66 in the outer surface of the ring valve 62 are aligned with the openings 60 to provide a flow passage therebetween. Thus, fluid flows through the opening 64 into the grooves 66 and hence out openings 60 to provide auxiliary flow for the cool viscous fluid. The variable difference in diameters between the ring 62 and wall 54 also provides a variable sized metering orifice for fluid flow.

The wall 54 and end member 52 may be made of steel having a thermal coefficient of expansion of about $0.6 \times 10^{-5}$ inches per inch-degree F. The ring valve 62 may be made of nylon having a thermal coefficient of expansion of about $5.5 \times 10^{-5}$ inches per inch-degree F. This produces a differential thermal coefficient of expansion of about $4.9 \times 10^{-5}$ inches per inch-degree F. The ring valve tested was sized to have the same outside diameter (1.28 inches) as the wall's inside diameter at 75° F. Between 0° and 75° F. the clearance between the ring valve 62 and the wall 54 decreases from 0.0047 inches to zero. This clearance at 0° F. provides a total flow area of 0.0189 square inches in both valve assemblies.

While the embodiment of the present invention as herein described constitutes a preferred form, it is to be understood that other forms may be adapted.

What is claimed is as follows:

1. A direct acting hydraulic fluid shock absorber of the type having a piston rod and interconnected valved piston reciprocable within a pressure cylinder tube; a reservoir tube around said pressure cylinder tube forming a reservoir chamber therebetween; a base valve assembly on one end of said pressure cylinder tube for controlling hydraulic fluid flow from the interior of said pressure cylinder tube to said reservoir chamber; the improvement comprising: valve means responsive to fluid temperature to vary the fluid flow resistance between the interior of said pressure cylinder tube and said reservoir chamber to compensate for changes in fluid viscosity with temperature; ports in said pressure cylinder tube communicating its interior with said reservoir chamber; means encircling said pressure cylinder tube and spaced from said ports forming an enclosed valve cage therebetween in fluid communication with the interior of said pressure cylinder tube through said ports; said means having an annular wall member spaced radially outward from said pressure cylinder tube and having openings therethrough to said reservoir chamber; a cylindrical ring valve in said valve cage spaced radially inwardly from said wall member and said openings when the fluid is below a predetermined temperature value whereby fluid flows between the interior of said pressure cylinder tube and the reservoir chamber in bypassed relation to said base valve assembly; said ring valve having a greater thermal coefficient of expansion than said wall member to cause said ring valve to expand radially and contact said wall member to close said openings when the temperature of the fluid is above said predetermined temperature whereby fluid flows solely through said valved piston and said base valve assembly.

2. A direct acting hydraulic fluid shock absorber with auxiliary valve means responsive to fluid temperature to vary the shock absorber's resistance to fluid flow comprising: a pressure cylinder tube; an annular piston rod guide closing one end of said pressure cylinder tube; a base valve assembly closing the other end of said pressure cylinder tube; a piston rod coaxially within said pressure cylinder tube and extending through said piston rod guide to the exterior of said shock absorber; valved piston means connected to said piston rod for reciprocation within said pressure cylinder tube; a reservoir tube around said pressure cylinder tube defining a fluid filled reservoir chamber therebetween; said pressure cylinder tube having ports communicating said pressure cylinder tube interior and said reservoir chamber; means encircling said pressure cylinder tube spaced from said ports and forming an enclosed valve cage therebetween in fluid communication with the interior of said pressure cylinder tube through said ports; said means having an annular wall member spaced radially outward from said pressure cylinder tube and having openings therethrough to said reservoir chamber; a cylindrical ring valve within said valve cage spaced radially inwardly from said wall member and said openings when the fluid is below a predetermined temperature whereby fluid passes between the interior of said pressure cylinder tube and the reservoir chamber in bypass relation to said base valve assembly; said ring valve having a greater thermal coefficient of expansion than said wall member to cause said ring valve to expand and contact said wall member to close said openings when the temperature of the fluid is above said predetermined temperature whereby fluid flows solely through said valved piston and said base valve assembly.

3. A direct acting hydraulic fluid shock absorber with auxiliary valve means responsive to fluid temperature to vary the shock abosrber's resistance to fluid flow comprising: a pressure cylinder tube; an annular piston rod guide covering one end of said pressure cylinder tube; a base valve assembly covering the other end of said pressure cylinder tube; a piston rod coaxially within said pressure cylinder tube and extending through said piston rod guide to the exterior of said shock absorber; valved piston means connected to said piston rod for reciprocation within said pressure cylinder tube; a reservoir tube around said pressure cylinder tube defining a fluid filled reservoir chamber therebetween; fluid ports radially through both ends of said pressure cylinder tube adjacent said piston rod guide and said base valve assembly; valve cage assemblies encircling both ends of said pressure cylinder tube having a wall member spaced radially outward from said pressure cylinder tube and said ports defining a passage therebetween; said wall portion having openings therethrough for communicating said passage and said reservoir chamber; a cylindrical ring valve element within said passage spaced radially inward from said wall member; annular grooves formed in the outer surface of said ring valve and axially aligned with said openings to permit the passage of fluid therethrough between said passage and said openings; said ring valve and said wall member being spaced from one another to provide an annular flow path therebetween when the fluid is below a predetermined temperature to allow fluid to flow therethrough in bypass relationship to said base valve assembly; said ring valve having a greater thermal coefficient of expansion than said wall member to cause said ring valve to expand against said wall member therefore covering said openings when the fluid temperature is above a predetermined temperature whereby fluid flows solely through said valved piston and said base valve assembly.

* * * * *